United States Patent [19]

Olson et al.

[11] Patent Number: 4,513,349

[45] Date of Patent: Apr. 23, 1985

[54] ACRYLATE-CONTAINING MIXED ESTER MONOMERS AND POLYMERS THEREOF USEFUL AS CAPACITOR DIELECTRICS

[75] Inventors: Daniel R. Olson; Timothy W. O'Donnell, both of Schenectady, N.Y.

[73] Assignee: General Electric Company, Schenectady, N.Y.

[21] Appl. No.: 562,872

[22] Filed: Dec. 19, 1983

[51] Int. Cl.³ .................. H01G 4/18; C08F 20/20; C07C 69/54

[52] U.S. Cl. .................. 361/311; 174/52 PE; 252/182; 252/579; 260/410; 260/410.6; 260/410.9 R; 260/410.9 N; 526/321; 526/323.1; 526/323.2; 560/205; 560/224

[58] Field of Search .................. 361/311, 317; 174/52 PE; 252/182, 579; 260/410 R, 410.6, 410.9 R, 410.9 N; 526/321, 323.1, 323.2; 560/205, 224

[56] References Cited

U.S. PATENT DOCUMENTS

| | | | |
|---|---|---|---|
| 2,296,837 | 9/1942 | Coes | 526/323.1 |
| 2,755,303 | 7/1956 | Schnell et al. | 560/224 |
| 2,902,451 | 9/1959 | Ross | 361/311 |
| 3,442,934 | 5/1969 | Pine | 560/224 |
| 3,743,532 | 7/1973 | Wright et al. | 428/336 |
| 3,855,508 | 12/1974 | Ross et al. | 252/579 |
| 4,243,818 | 1/1981 | Rogier | 560/224 |
| 4,329,419 | 5/1982 | Goff et al. | 430/283 |
| 4,410,644 | 10/1983 | Bunyan | 526/323.1 |

FOREIGN PATENT DOCUMENTS 76385  7/1978  Japan ................... 252/579

*Primary Examiner*—Paul Lieberman
*Assistant Examiner*—Robert A. Wax
*Attorney, Agent, or Firm*—William H. Pittman; James C. Davis, Jr.; James Magee, Jr.

[57] ABSTRACT

Compositions comprising mixed acrylates and propionates, or the like, of polyhydroxy compounds of the formula $R^1(OH)_n$, wherein $R^1$ is an aliphatic or alicyclic radical having about 1–40 carbon atoms and n is from 2 to 4, may be polymerized to form polymers useful as dielectrics for capacitors. Said capacitors are characterized by low dissipation factors at both high and low temperatures.

23 Claims, No Drawings

ACRYLATE-CONTAINING MIXED ESTER MONOMERS AND POLYMERS THEREOF USEFUL AS CAPACITOR DIELECTRICS

This invention relates to new monomeric compositions of matter and polymers thereof, said polymers being useful for a number of purposes including the formulation of dielectrics. In their broadest definition, the compositions of this invention comprise mixtures of esters having the formulas

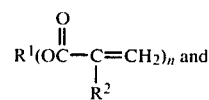  (I)

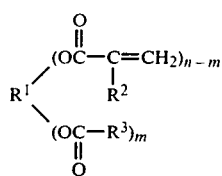  (II)

wherein:
$R^1$ is an aliphatic, alicyclic or mixed aliphatic-alicyclic radical having about 10–40 carbon atoms which optionally contains up to about three non-conjugated olefinic linkages;
$R^2$ is hydrogen or methyl;
$R^3$ is an aliphatic hydrocarbon radical containing about 1–20 carbon atoms and free from acetylenic and polymerizable ethylenic unsaturation;
n is from 2 to 4; and
m is less than n and is from 1 to 3;
at least about 50% of the carboxylate moieties in said compositions having the formula

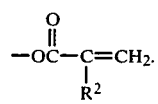  (III)

Capacitors are used in a wide variety of electrical circuits, for example in relatively high voltage AC power systems (such as the common 110-volt systems) and in relatively low voltage (e.g., under 50 volts) DC systems frequently encountered in printed circuits and the like. Important factors which must be considered in the manufacture of such capacitors are efficiency, temperature of operation, dissipation factor and behavior upon failure.

Efficiency is normally measured in terms of capacitance per unit volume. High efficiency is desirable, with values of at least 50 microfarads per cubic inch being preferred. Operating temperature and dissipation factor are related since many capacitors, especially operating at relatively high temperatures, function inadequately because they dissipate their electrical energy as heat.

Finally, the behavior of a capacitor upon failure may be a critical factor in the operation of the circuit in which the capacitor is used. Upon failure of a ceramic capacitor, for example, the circuit is not broken and surges in voltage and/or current may cause damage to other components therein. It is desirable that breakage of the circuit occur when a capacitor fails, thereby preventing such damage.

In copending, commonly assigned application Ser. No. 562,779 there is disclosed a novel capacitor structure having particularly advantageous properties with respect to these and other criteria. This structure comprises successive conductive layers which are offset so as to define a central capacitance region of stacked isolated extending layers, a coating of dielectric deposited on each said layers so that the layers in the capacitance region are substantially spaced and separated by said coating of dielectric, the deposition of said coating being controlled so as to slope toward cutoff lines spaced substantially from two separated portions of the central capacitor region, said conductive layers extending beyond said cutoff lines so that successive layers fuse into spaced apart terminal portions, and said cutoff line spacing being sufficient to cause the uppermost dielectric coating of the capacitor to have a horizontal dimension from the capacitor region to the terminal portion to accept a final layer deposition. Most often, said capacitors contain at least 100 dielectric-coated electrode layers. Copending, commonly assigned application Ser. No. 562,873 discloses a wide variety of polyfunctional acrylate polymers useful as dielectrics in these and other capacitors. The disclosures of both of the aforementioned applications are incorporated by reference herein.

Various other polyfunctional acrylate polymers, and monomeric precursors therefor, are disclosed and claimed in copending, commonly assigned applications Ser. Nos. 562,871, 562,893 and 562,894. (The disclosures of all five of the aforementioned applications are incorporated by reference herein.) These polymers are characterized by particularly low dissipation factors over a relatively wide temperature range. At room temperature and below, however, the dissipation factors frequently increase more rapidly than is desirable. It is of interest, therefore, to develop polymers with low dissipation factors over a still wider temperature range, as well as monomeric precursors for such polymers.

A principal object of the present invention is to provide novel ester monomers and polymers thereof.

A further object is to provide ester monomers which, upon polymerization, yield materials suitable for use as dielectrics.

Another object is to provide ester monomers whose polymers have low dissipation factors over an extremely wide range of temperatures.

Another object is to provide polymeric dielectric materials useful in thin film capacitors.

Still another object is to provide ester monomers which are easy to deposit as thin films, said films being subsequently polymerizable by irradiation or the like to form layers useful as dielectrics in thin film capacitors.

Other objects will in part be obvious and will in part appear hereinafter.

As will be apparent from formula I, the monomeric compositions of this invention comprise ester mixtures derived from a wide variety of polyhydroxy compounds of the formula $R^1(OH)_n$. The radical $R^1$ may be aliphatic, alicyclic or mixed aliphatic-alicyclic; it may optionally contain up to about three olefinic linkages which are non-conjugated, and contains about 10–40 carbon atoms. Suitable polyhydroxy compounds include straight chain compounds such as hexadecanediol and octadecanediol, with the hydroxy groups being located anywhere on the chain, and branched chain isomers thereof. By "branched chain" is meant that at least one carbon atom is present in a branch. Thus, configurations such as

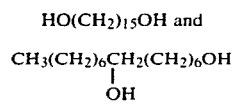

are unbranched, while

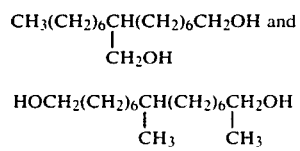

are branched.

A first preferred class of polyhydroxy compounds consists of those characterized by being branched and also by having at least 18 carbon atoms in a single chain; that is, at least 18 carbon atoms are successively bonded without branching. Particularly suitable polyfunctional acrylates derived therefrom are those having the formulas

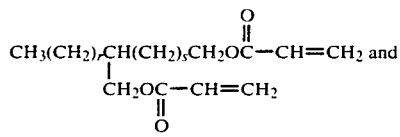 (IV)

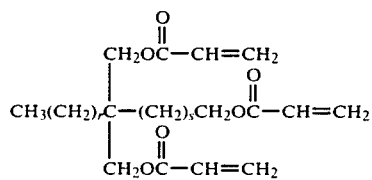 (V)

wherein r and s are each 7 or 8 and the sum of r and s is 15. They may be obtained, for example, by acrylic acid esterification of the hydroformylation products of oleic acid, as disclosed in U.S. Pat. No. 4,243,818. Another suitable compound is 1,12-octadecanediol diacrylate, formed by hydrogenolysis of ricinoleic acid followed by esterification.

Also within this first preferred class of polyhydroxy compounds are single compounds and mixtures, usually mixtures, in which $R^1$ is at least one aliphatic or alicyclic radical containing about 20–40 carbon atoms and optionally up to about three non-conjugated olefinic linkages. At least about 40%, and preferably at least about 50%, of the total number of $R^1$ radicals therein are alicyclic. Thus, the polyhydroxy compounds may be entirely alicyclic or may be mixtures of aliphatic and alicyclic compounds satisfying these percentage limitations.

It is frequently convenient to prepare such polyhydroxy compounds by reduction of at least one corresponding polycarboxylic acid or ester thereof, which may be saturated or may contain olefinic linkages. A typical suitable polycarboxylic acid is linoleic acid dimer (hereinafter "dimer acid"), a mixture consisting essentially of acyclic, monocyclic and bicyclic dicarboxylic acids which typically contain up to two olefinic bonds per molecule. A particularly suitable dimer acid is sold by Emery Industries under the trade designation "Empol 1010". According to Kirk-Othmer, *Encyclopedia of Chemical Technology*, Third Edition, Volume 7, pp. 768–770, the following are structures of typical molecular species present in the methyl ester of dimer acid:

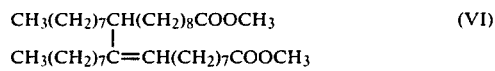 (VI)

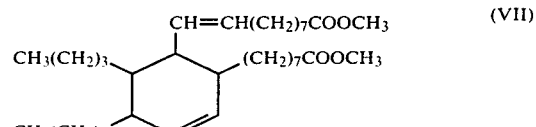 (VII)

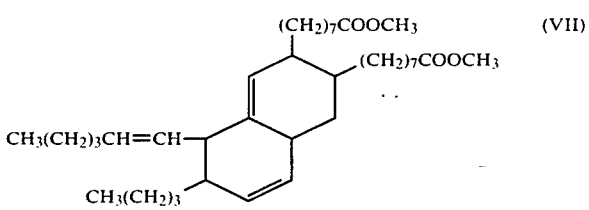 (VII)

Thus, free dimer acid obviously comprises free dicarboxylic acids having corresponding structures.

The esters of formula VI, VII and VIII, their corresponding free acids, and similar polycarboxylic acids and esters may be reduced by known methods, such as by hydrogen in the presence of a hydrogenation catalyst or by lithium aluminum hydride, to produce diols useful for preparation of the polyfunctional acrylates of this invention. Depending on the method of reduction of these or similar acids or esters, the reduction product may be saturated or may contain olefinic linkages. For example, lithium aluminum hydride reduction normally will not affect olefinic linkages while some hydrogenation methods (e.g., in the presence of a palladium catalyst) will reduce them to saturated linkages. Thus, reduction of compounds VI, VII and VIII may produce diols of the respective formulas

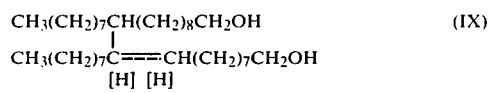 (IX)

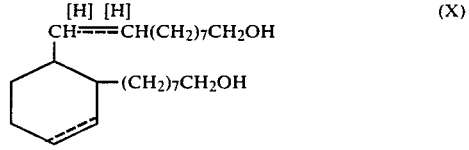 (X)

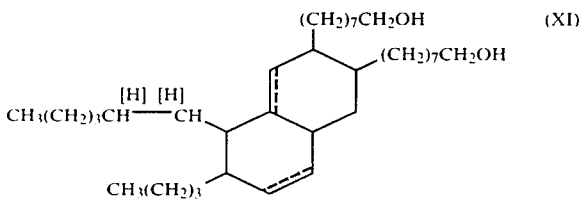 (XI)

wherein the broken lines and hydrogen atoms in brackets indicate that the corresponding carbon-carbon bonds may be single or double bonds depending on the method of reduction. It is frequently found that the compounds of this invention which contain only single bonds have properties somewhat more favorable than those of the analogous double-bonded compounds. Suitable diol mixtures of this type are commercially available from Henkel Corporation under the trade name "Dimerol".

Other suitable polyhydroxy compounds within this first preferred class may be prepared by reduction of various acrylic acid-unsaturated fatty acid condensation products. These polyhydroxy compounds may be illustrated by the formula

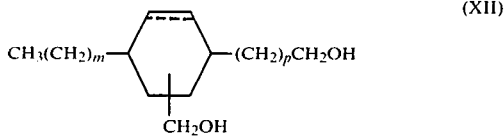

(XII)

wherein m may be, for example, from 3 to 5, p may be from 7 to 9 and the sum of m and p is 12. A typical commercially available dicarboxylic acid which may be reduced to a diol of formula XII is sold under the trade designation "Westvaco 1550 Diacid"; it has the formula

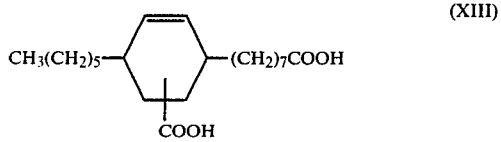

(XIII)

and is an adduct of linoleic and acrylic acids. It is also described in Kirk-Othmer, op. cit, at p. 779.

A second preferred class of polyhydroxy compounds consists of 1,2-alkanediols in which $R^1$ has the formula

wherein $R^4$ is an alkyl radical containing about 8–28 carbon atoms. Examples of suitable $R^4$ radicals are 1-octyl, 2-methylheptyl, 1-nonyl, 2,3-dimethylheptyl, 1-decyl, 2-dodecyl, 1-tetradecyl, 1-octadecyl, 1-eicosyl and 1-docosyl. Radicals having the formula $R^5CH_2$, wherein $R^5$ is an alkyl and especially a straight-chain alkyl radical having about 7–27 and most often about 9–17 carbon atoms, are preferred as $R^4$.

As will be apparent from formula I, the constituents of the ester mixtures of this invention include acrylates and/or methacrylates, preferably acrylates (both sometimes collectively identified hereinafter as "acrylate"). Also present, as shown by formula II, are mixed esters containing both acrylate moieties and carboxylate moieties derived from a carboxylic acid of the formula $R^3COOH$ in which $R^3$ contains about 2–19 carbon atoms and is free from acetylenic and polymerizable ethylenic unsaturation. The $R^3$ groups are preferably alkyl radicals, especially those containing 1–7 and most often 2–4 carbon atoms. Illustrative carboxylic acids of this type are acetic, propionic, butyric, 2-ethylhexanoic, lauric, palmitic, stearic and oleic acids.

The present invention is of particular value in connection with the multilayer stacked type capacitors of the aforementioned application Ser. No. 562,779. Such capacitors are frequently produced by a method which includes vapor deposition of monomers, followed by polymerization to form the dielectric member. Vapor deposition conditions for the ester mixtures of this invention are optimized when the carboxylate moieties are substantially similar in their contributions to the volatility of the ester mixture. Therefore, it is most preferred that $R^3$ be of a size and molecular weight similar to that of the corresponding moiety in the acrylate radical, and specifically that $R^3$ be the ethyl radical, that is, that $R^3COOH$ be propionic acid.

Of the total number of carboxylate moieties in the ester mixtures of this invention, at least about 50%, usually about 65–99% and preferably about 70–90%, have formula III. Thus, a major proportion of the carboxylate moieties are polymerizable.

Procedures for esterification of the polyhydroxy compounds will be apparent to one skilled in the art. Thus, the alcohol and acids may typically be reacted in a suitable solvent, typically in the presence of a small amount of an acidic esterification catalyst such as sulfuric acid, p-toluenesulfonic acid, acidic ion exchange resins or acidified clays. Ordinarily, a stoichiometric excess of the acids is used, the ratio of equivalents of acid to diol typically being between about 1.1:1 and about 2:1. Any excess acid may be removed by washing with aqueous alkaline solutions after esterification.

In order to minimize the amount of esters of the formula

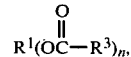

it is preferred to react the polyhydroxy compound sequentially with the two acids. This may be done in either order; it is somewhat preferred to react first with the acrylic acid. The mole ratio of acrylic acid to the other acid is at least 1:1, most often about 1.65–1.99:1 and preferably about 1.7–1.9:1. Because there is some degree of uncertainty about the exact proportions of the various esters in the mixtures of this invention, it is also appropriate to define said mixtures in terms of the sequential method for their preparation.

The esterification reaction is ordinarily carried out at about 50°–200° C., most often about 60°–150° C. It is often preferred to incorporate in the esterification mixture a minor amount of a polymerization inhibitor such as p-methoxyphenol, 2,6-di-t-butylphenol or 2,4,6-tri-t-butylphenol. The acids may be replaced by functional derivatives thereof such as the corresponding acyl halides, lower alkyl esters or amides, with suitable modification of the reaction conditions.

The preparation of the ester mixtures of this invention is illustrated by the following examples. All parts are by weight unless otherwise indicated.

EXAMPLE 1

A solution of 102.6 parts (0.34 mole) of a diol having the formula

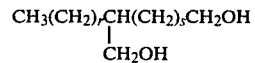

in which the sum of r and s is 15, 36 parts (0.5 mole) of acrylic acid, 2.5 parts of p-methoxyphenol and 2.33 parts of p-toluenesulfonic acid in 200 parts of n-hexane was heated under reflux as water was removed by azeotropic distillation. After several hours of reaction, 20 parts (0.27 mole) of propionic acid was added and refluxing was continued for 24 hours. The solution was cooled, washed several times with aqueous potassium hydroxide solution and dried. The desired mixed acrylate-propionate was obtained as a liquid upon evaporation of solvent.

EXAMPLE 2

A solution of 100 grams (0.303 moles) of a triol having the formula

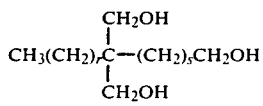

in which the sum of r and s is 15, 2.5 grams of p-methoxyphenol and 2.33 grams of p-toluenesulfonic acid in 300 ml. of n-hexane was heated under reflux with stirring and 50 grams (0.69 mole) of acrylic acid was added. Heating and stirring were continued for several hours as water was removed by azeotropic distillation. After several hours of reaction, 24 grams (0.32 mole) of propionic acid was added and refluxing was continued for several hours. The solution was cooled, washed several times with aqueous potassium hydroxide solution and dried. The desired mixed acrylate-propionate (127.1 grams, or 85% of theoretical) was obtained as a liquid upon evaporation of solvent.

EXAMPLE 3

A solution of 51 parts (0.20 mole) of 1,2-hexadecanediol, 30 parts (0.15 mole) of lauric acid and 1.5 grams of p-toluenesulfonic acid in 400 parts of toluene is heated for about 24 hours under reflux as water is removed by azeotropic distillation. Acrylic acid, 21.6 parts (0.3 mole), is then added and heating is continued until water evolution ceases. The solution is cooled, filtered and washed several times with dilute potassium chloride solution and once with dilute sodium chloride solution. It is then dried and the solvent is evaporated to afford the desired 1,2-hexadecanediol ester mixture as a liquid.

The ester mixtures of this invention may be polymerized under free-radical conditions, either alone or in the presence of other monomers. The term "polymer," as used herein, includes addition homopolymers and copolymers with one or more other monomers.

Polymerization by the free-radical method may be effected in bulk, solution, suspension or emulsion, by contacting the monomer or monomers with a polymerization initiator either in the absence or presence of a diluent at a temperature of about 0°-200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation.

A large variety of polymerizable compounds can be used to form copolymers with the ester mixtures of this invention. The include the following:

1. Unsaturated alcohols and esters thereof: Allyl, methallyl, crotyl, 1-chloroallyl, 2-chloroallyl, cinnamyl, vinyl, methylvinyl, 1-phenallyl and butenyl alcohols; and esters of such alcohols with saturated acids such as acetic, propionic, butyric, valeric, caproic and stearic; with unsaturated acids such as acrylic, α-substituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g, benzoic, phenylacetic, phthalic, terephthalic and benzoylphthalic acids.

2. Unsaturated acids (examples of which appear above) and esters thereof with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.

3. Unsaturated lower polyhydric alcohols, e.g., butenediol, and esters thereof with saturated and unsaturated aliphatic and aromatic, monobasic and polybasic acids, examples of which appear above.

4. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

5. Vinyl cyclic compounds including styrene, o-, m-, p-chlorostyrenes, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpridine, vinylbenzofuran, N-vinylcarbazole, N-vinylpyrrolidone and N-vinyloxazolidone.

6. Unsaturated ethers such as methyl vinyl ether, ethyl vinyl ether, cyclohexyl vinyl ether, octyl vinyl ether, diallyl ether, ethyl methallyl ether and allyl ethyl ether.

7. Unsaturated ketones, e.g., methyl vinyl ketone and ethyl vinyl ketone.

8. Unsaturated amides, such as acrylamide, methacrylamide, N-methylacrylamide, N-phenylacrylamide, N-allylacrylamide, N-methylolacrylamide, N-allylcaprolactam, diacetone acrylamide, hydroxymetholated diacetone acrylamide and 2-acrylamido-2-methylpropanesulfonic acid.

9. Unsaturated aliphatic hydrocarbons, for instance, ethylene, propylene, butenes, butadiene, isoprene, 2-chlorobutadiene and α-olefins in general.

10. Unsaturated alkyl halides, e.g., vinyl fluoride, vinyl chloride, vinyl bromide, vinylidene chloride, vinylidene bromide, allyl chloride and allyl bromide.

11. Unsaturated acid anhydrides, e.g., maleic, citraconic, itaconic, cis-4-cyclohexene-1,2-dicarboxylic and bicyclo(2.2.1)-5-heptene-2,3-dicarboxylic anhydrides.

12. Unsaturated acid halides such as cinnamyl acrylyl, methacrylyl, crotonyl, oleyl and fumaryl chlorides or bromides.

13. Unsaturated nitriles, e.g., acrylonitrile, methacrylonitrile and other substituted acrylonitriles.

By virtue of the polyfunctionality of the esters of formula I, the ester mixtures of this invention form crosslinked polymers. Thus, they are adapted to the production of heat-resistant polymeric films.

The polymers of this invention are useful, for example, in the preparation of corrosion-resistant coatings and as ingredients for printing inks. They are also useful as insulating materials in certain electrical applications; for example, as potting compositions and as encapsulation resins.

A principal utility of the polymers of this invention, as previously mentioned, is as dielectric compositions in capacitors. The polymers are very useful in this respect because of their adaptability to the production of capacitors with high efficiency and with a low dissipation factor over a very wide temperature range. While the invention is not dependent on any theory of operation, it is believed that the $R^3$ groups in the ester mixtures act as plasticizing agents, causing a lowering of phase transition points of some kind at which there is a change in the conductivity properties of the polymer, and which otherwise may appear at temperatures generally in the vicinity of $-20°$ to $-30°$ C.

The electrodes in the capacitors may be formed of materials and in configurations known in the art. Typical conductive materials are aluminum, copper, zinc, tin, stainless steel and alloys thereof, with aluminum being preferred.

A preferred subgenus of the polymers of this invention from the standpoint of use as dielectric members for capacitors consists of polymers in which all of the units are derived from the ester mixtures of this invention, which are especially preferred. Also contemplated are copolymers of said ester mixtures with other mono- and polyacrylates. Illustrative of suitable monoacrylates are those of higher monohydroxy alcohols such as isodecyl alcohol or of higher monoepoxides, the term "higher" denoting at least 8 carbon atoms. The preferred copolymers, however, are those with other polyfunctional acrylates illustrated by those of such compounds as trimethylolpropane, neopentyl glycol, polybutadiene-derived polyols and polyepoxides. The copolymers are typically prepared from blends comprising about 25–75% by weight of the ester mixtures of this invention, with the balance being other acrylates.

Capacitors containing the polymers of this invention as dielectrics have particularly advantageous properties, including high efficiency and low dissipation factors, when their configuration is as disclosed and claimed in the above-identified application Ser. No. 562,779. Capacitors of this type may be produced by depositing alternating electrode and dielectric layers so as to provide alternate electrode layers with portions projecting from the stack and contacting each other in electrically connected relation.

The particular suitability of the polymers of this invention as capacitor dielectrics is illustrated by the following examples.

EXAMPLE 4

Prototype capacitors were produced by drawing down monomer layers on an aluminum foil substrate, polymerizing said layer by contact with a 10-megarad electron beam, and depositing a metallic aluminum layer thereon. The monomer compositions used were the product of Example 1 and a corresponding diacrylate. The thickness of the aluminum foil electrode was 12.5 microns, that of the dielectric layer was 3–6 microns and that of the deposited aluminum electrode was 300–500 Angstroms (0.03–0.05 micron). The area of the prototype capacitor was about 1 square inch. The dissipation factor of the test capacitor prepared from the product of Example 1, measured at 60 Hz. using an AC bridge, varied from a minimum of 0.3% at 30° C. to a maximum of 1.45% at 150° C. The dissipation factor of the capacitor prepared from the diacrylate varied from a maximum of 2.7% at 30° C. to a minimum of 0.15% at 130° C.

As will be apparent from these results, capacitors containing the polymers of this invention as dielectrics are characterized by versatility of application, typically including extremely low dissipation factors at both high and very low temperatures.

What is claimed is:

1. A composition comprising mixtures of esters having the formulas

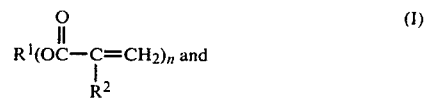

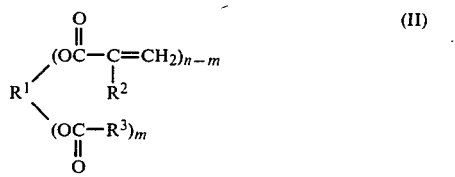

wherein:
  $R^1$ is an aliphatic, alicyclic or mixed aliphatic-alicyclic radical having about 10–40 carbon atoms which optionally contains up to about three non-conjugated olefinic linkages;
  $R^2$ is hydrogen or methyl;
  $R^3$ is an aliphatic hydrocarbon radical containing about 2–20 carbon atoms and free from acetylenic and polymerizable ethylenic unsaturation;
  n is from 2 to 4; and
  m is less than n and is from 1 to 3;
  at least about 50% of the carboxylate moieties in said compositions having the formula

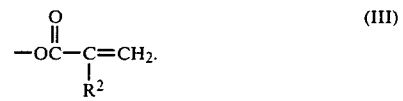

2. A composition according to claim 1 wherein $R^2$ is hydrogen and $R^3$ is ethyl.

3. A composition according to claim 2 wherein $R^1$ is a branched chain radical having at least 18 carbon atoms in a single chain.

4. A composition according to claim 3 wherein $R^1$ has the formula

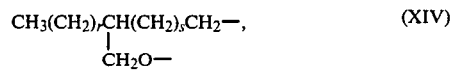

wherein r and s are each 7 or 8 and the sum of r and s is 15.

5. A composition according to claim 4 wherein about 70–90% of the carboxylate moieties have formula III.

6. An ester mixture prepared by reacting sequentially, in either order,
  a polyhydroxy compound having the formula $R^1(OH)_n$, wherein $R^1$ is an aliphatic, alicyclic or mixed aliphatic-alicyclic radical having about 10–40 carbon atoms which optionally contains up to about three non-conjugated olefinic linkages and n is from 2 to 4, with a first carboxylic acid having the formula

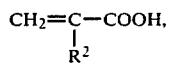

wherein $R^2$ is hydrogen or methyl, or a functional derivative thereof, and a second carboxylic acid having the formula $R^3COOH$, or a functional derivative thereof, wherein $R^3$ is an aliphatic hydrocarbon radical containing about 2–20 carbon atoms and free from acetylenic and polymerizable ethylenic unsaturation, the mole ratio of said first acid to said second acid being at least 1:1.

7. An ester mixture according to claim 6 wherein $R^2$ is hydrogen and $R^3$ is ethyl.

8. An ester mixture according to claim 7 wherein $R^1$ is a branched chain radical having at least 18 carbon atoms in a single chain.

9. An ester mixture according to claim 8 wherein $R^1$ has the formula

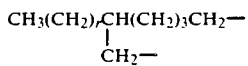

wherein r and s are each 7 or 8 and the sum of r and s is 15.

10. An ester mixture according to claim 9 wherein the polyhydroxy compound is reacted first with said first acid and subsequently with said second acid.

11. An ester mixture according to claim 10 wherein the mole ratio of said first acid to said second acid is about 1.7–1.9:1.

12. An addition polymer of an ester mixture according to claim 1.

13. A polymer according to claim 12 in which all of the units are derived from said ester mixture.

14. An addition polymer of an ester mixture according to claim 6.

15. A polymer according to claim 14 in which all of the units are derived from said ester mixture.

16. A capacitor comprising two electrodes separated by a dielectric member, said dielectric member comprising a polymer according to claim 12.

17. A capacitor according to claim 16 wherein the electrodes are aluminum.

18. A capacitor comprising two electrodes separated by a dielectric member, said dielectric member comprising a polymer according to claim 13.

19. A capacitor according to claim 18 wherein the electrodes are aluminum.

20. A capacitor comprising two electrodes separated by a dielectric member, said dielectric member comprising a polymer according to claim 14.

21. A capacitor according to claim 20 wherein the electrodes are aluminum.

22. A capacitor comprising two electrodes separated by a dielectric member, said dielectric member comprising a polymer according to claim 15.

23. A capacitor according to claim 22 wherein the electrodes are aluminum.

* * * * *